US007974748B2

(12) United States Patent
Goerick et al.

(10) Patent No.: US 7,974,748 B2
(45) Date of Patent: Jul. 5, 2011

(54) DRIVER ASSISTANCE SYSTEM WITH VEHICLE STATES, ENVIRONMENT AND DRIVER INTENTION

(75) Inventors: Christian Goerick, Seligenstadt (DE); Jens Gayko, Frankfurt am Main (DE); Martin Schneider, Reinheim (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 893 days.

(21) Appl. No.: 11/505,541

(22) Filed: Aug. 16, 2006

(65) Prior Publication Data

US 2007/0043491 A1 Feb. 22, 2007

(30) Foreign Application Priority Data

Aug. 18, 2005 (EP) .................................... 05017976

(51) Int. Cl.
*G01C 22/00* (2006.01)
(52) U.S. Cl. ......................................... 701/28; 701/301
(58) Field of Classification Search .................... 701/41, 701/300, 28, 301; 340/426.22, 426.23, 436
See application file for complete search history.

(56) References Cited

U.S. PATENT DOCUMENTS

| | | | | |
|---|---|---|---|---|
| 4,970,653 | A * | 11/1990 | Kenue ........................... | 701/301 |
| 5,790,403 | A * | 8/1998 | Nakayama ....................... | 701/28 |
| 5,870,507 | A * | 2/1999 | Nagao et al. ................... | 382/286 |
| 6,026,340 | A * | 2/2000 | Corrado et al. ................. | 701/47 |
| 6,317,693 | B2 * | 11/2001 | Kodaka et al. ................. | 701/301 |
| 6,580,973 | B2 * | 6/2003 | Leivian et al. .................. | 701/1 |
| 6,675,081 | B2 * | 1/2004 | Shuman et al. ................. | 701/48 |
| 7,124,027 | B1 * | 10/2006 | Ernst et al. ..................... | 701/301 |
| 7,162,361 | B2 * | 1/2007 | Heinrichs-Bartscher ..... | 701/117 |
| 7,236,866 | B2 * | 6/2007 | Takafuji et al. ................ | 701/45 |
| 7,243,014 | B2 * | 7/2007 | Takamatsu et al. ............. | 701/48 |

(Continued)

FOREIGN PATENT DOCUMENTS

WO    WO 02/25291 A2    3/2002

OTHER PUBLICATIONS

European Search Report, EP 05017976.1, Feb. 2, 2006, 8 Pages.

*Primary Examiner* — Thomas G Black
*Assistant Examiner* — Sze-Hon Kong
(74) *Attorney, Agent, or Firm* — Fenwick & West LLP

(57) ABSTRACT

A driver assistance system with an architecture of general use for applications related to driver assistance, passenger safety and comfort and communication with external systems, e.g. for diagnosis and maintenance purposes, comprises (in one embodiment): a first interface for sensing external signals coming from the environment of a vehicle, a second interface for sensing internal signals of the vehicle, a first subsystem for fusing the output signals of the first interface and the second interface in order to generate a representation of the vehicle's environment, a second subsystem for modeling the current state of the vehicle being provided with the output signals of the first subsystem, a third subsystem for modeling the behavior of a driver, a fourth subsystem for interpreting the current scene represented by the first subsystem in order to determine characteristic states of the current external situation of the vehicle, and a fifth subsystem that generates stimuli for the actuators of the vehicle and/or the driver based on the output signals of the second, the third and the fourth subsystem.

32 Claims, 2 Drawing Sheets

U.S. PATENT DOCUMENTS

| | | | |
|---|---|---|---|
| 7,254,482 B2* | 8/2007 | Kawasaki et al. | 701/211 |
| 7,343,234 B2* | 3/2008 | Kameyama | 701/36 |
| 7,424,364 B2* | 9/2008 | Gern et al. | 701/301 |
| 7,486,802 B2* | 2/2009 | Hougen | 382/104 |
| 7,561,951 B2* | 7/2009 | Rao et al. | 701/48 |
| 7,840,330 B2* | 11/2010 | Heinrichs-Bartscher | 701/96 |
| 2002/0005778 A1* | 1/2002 | Breed et al. | 340/435 |
| 2002/0120371 A1 | 8/2002 | Leivian et al. | |
| 2003/0065432 A1 | 4/2003 | Shuman et al. | |
| 2003/0174054 A1* | 9/2003 | Shimomura | 340/435 |
| 2004/0019426 A1 | 1/2004 | Knoop et al. | |
| 2004/0036601 A1* | 2/2004 | Obradovich | 340/540 |
| 2004/0252864 A1* | 12/2004 | Chang et al. | 382/104 |
| 2005/0033517 A1* | 2/2005 | Kondoh et al. | 701/301 |
| 2005/0154530 A1* | 7/2005 | Hosokawa et al. | 701/301 |
| 2005/0273212 A1* | 12/2005 | Hougen | 701/1 |
| 2006/0028465 A1* | 2/2006 | Imai | 345/419 |

* cited by examiner

DRIVER ASSISTANCE SYSTEM WITH VEHICLE STATES, ENVIRONMENT AND DRIVER INTENTION

FIELD OF THE INVENTION

The invention relates to driver assistance systems and more particularly to automotive driver assistance systems and methods.

BACKGROUND OF THE INVENTION

Driver assistance systems are control systems for vehicles or intelligent vehicle technologies that aim at increasing the comfort and safety of traffic participants. Potential applications of such systems include lane departure warning, lane keeping, collision warning or avoidance, adaptive cruise control and low speed automation in congested traffic.

Driver assistance systems in the context of the present invention can thereby "assist" an action triggered or performed by a driver, but can also autonomously start and carry out a control action for the vehicle.

One of the above mentioned applications typically uses a manifold of separate sensors and electronic control units (ECUs) for sensor control, analyzing the sensor data and generating suitable output signals. For example, RADAR (RAdio Detecting And Ranging), and LIDAR (Light Detecting And Ranging) sensors can accurately measure distances to sensed objects, but they cannot provide any semantic information related to the sensed objects (e.g. in which lane a vehicle is located, what kind of object is being sensed). Such information needs additionally to be gathered by a video camera or cameras.

Due to the general tendency to increase safety and support driver and passengers with new comfort functions, the complexity of each of the applications as well as the number of applications within a modern vehicle is increasing and will increase further in the future. Basically, a vehicle with several sensor systems means a respective number of ECUs, where all the ECUs perform their tasks independent from the others.

Conventional vehicles have a bus system, for example the CAN ("Controller Area Network")—bus, with which most or all ECUs are connected. The CAN-bus allows to exchange data between the connected ECUs. However, it turns out that by just adding together several sensors and/or applications and interconnecting them with a bus, only simple driver assistance systems can satisfactorily be constructed regarding aspects like reliability or stability and robustness.

Nevertheless it is a goal to further enhance safety, offer more comfort functions and at the same time limit costs for the development of such new and/or enhanced safety and comfort features. Thus what is needed is a system and method that integrates the up-to-now separated sensor systems into a single information system, which actively controls the vehicle and/or assists the vehicle operator.

However, no such general model of behavior generation is known. Existing assistance driver systems comprise a sensor or several sensors and subsequent sensor data processing steps specifically designed for a particular application. To implement a further application, essentially a redesign of the system is required.

SUMMARY OF THE INVENTION

In view of the above, it is an object of the invention to provide a driver assistance system which is based on a flexible architecture, such that it can be easily adapted.

It is a further object of the invention to provide a driver assistance system allowing significant safety and comfort improvements compared to existing systems.

Another object of the invention is to provide a driver assistance system or a respective method which allows the sharing of limited resources, e.g. in terms of energy consumption, computing power or space.

It is a further object of the invention to provide a driver assistance system able to make robust predictions and enable complex behavior.

Another object of the invention is to provide a modular architectural concept which easily allows the incorporation of new elements, for example on sensory side, new applications or units for enhanced internal processing.

It is a further object of the invention to provide a driver assistance system which allows real-time control and action selection.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
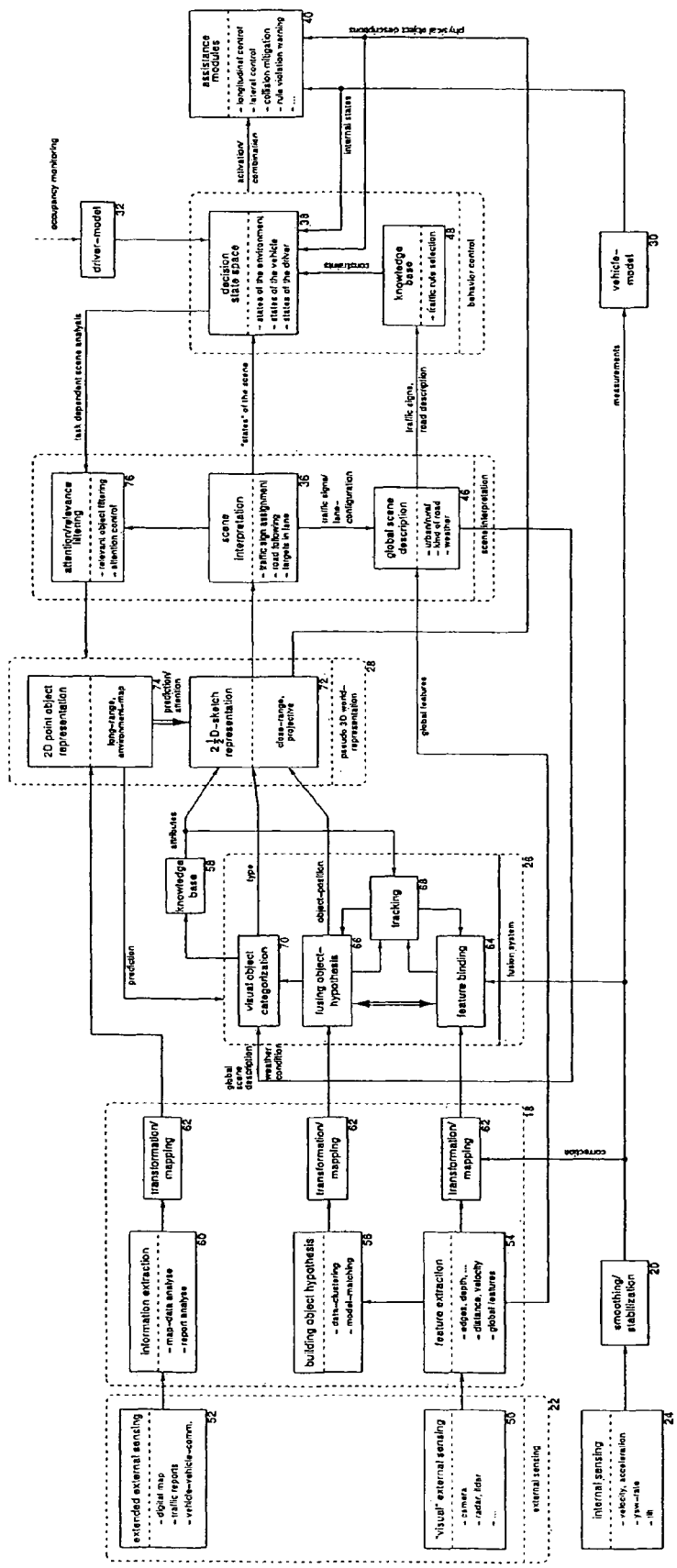
FIG. 1 in the form of a functional block diagram an embodiment of a driver assistance system according to the invention; an FIG. 2 in schematic form details of the information fusion, scene representation and interpretation subsystems of the embodiment of FIG. 1.

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

In order to reliably accomplish the above mentioned objects, one embodiment of the invention proposes a driver assistance system unifying several a priori separated sensor systems, and which implements a central model of the vehicle's environment. The model is obtained by analyzing the data delivered by the different kinds of sensors. The common representation forms the basis for implementation of complex behavior of the system, for example generate warning messages for the driver and/or control commands for the various actuators of the vehicle the system is connected with.

The invention proposes a general architecture for a driver assistance system, and therefore differs from the prior art according to which specific separately existing sensor systems are interconnected. Within the system of the invention, a sensor is not specifically assigned to a particular application, but a number of internal and external sensors is integrated into the system to arrive at the above mentioned central representation of the environment. Thus, new applications might be defined without any change in the sensor pool of a vehicle.

From the above it is clear that information fusion (data fusion) is an important aspect of the inventive driver assistance system. For example, the object information obtained by an image processing stage must be fused with data stemming from other sensors, for example RADAR data, to reach at a unified description of the sensed environment.

With the help of symbolic information, the result of the fusion process, namely the scene representation, is evaluated and a behavior created.

As the driver assistance system according to the invention operates independently of the driver to output information to the driver or act on the vehicle's actuators, the system will occasionally also be called 'agent' throughout this document.

Some of the advantages of various embodiments of the invention are summarized in the following.

The architecture of the driver assistance system is based upon a central representation of the environment and the own state of the vehicle. Therefore the invention can save limited resources as, for example, energy, computing power and space. These resources are shared among the various assistance functions implemented within the common architecture according to the invention. Further, according to the invention, several control centers are coordinated or integrated, thus stabilizing the overall system.

The representation is in a suitable form for producing complex or high-level behavior, as the inventive agent allows to integrate and stabilize over time several information streams, thus ensuring robustness.

The inventive agent also provides instant access to available information for high-level real-time control and action selection. As it is technically not feasible to interpret a scene in all details, the perception is organized and supported by prediction, in this way enabling complex behavior.

The inventive model describes an open modular structure to allow the exchanging of elements (subsystems, modules, units) in order to follow technological progress with minimum cost and effort. Eventually the model will also allow human factors to be taken into account.

FIG. 1 illustrates in the form of a functional block diagram a specific embodiment of an inventive driver assistance system. The system is connected with its environment 10, a vehicle 12 interacting with the environment 10, a driver 14 and possibly additional passengers 16.

The driver assistance system can be implemented into the vehicle as an agent, i.e. as a, for example, autonomously operating software system (firmware), which is, for example, flashed into a programmable device (not shown) as part of the vehicle 12. The device may be either a single central processing unit or may include several processors distributed throughout the vehicle 12.

FIG. 1 shows in detail the interaction between the inventive agent and a driver 14. Further possible interactions with external systems or humans, e.g. service personnel of a garage, is omitted for the sake of clarity.

The functional components of the system are sketched first. In principle, the agent comprises an input stage (an interface for input data), a processing stage and an output stage (an interface for output data). Two pre-processing units 18, 20 form the input stage. These are connected with external sensing 22 (e.g. Radar, Lidar, Video, GPS, electronic traffic reports, vehicle-vehicle-communication, digital maps etc) and internal sensing 24 (e.g. Velocity, acceleration, yaw-rate, tilt, altitude etc.) respectively. The units 18, 20 are connected to a first subsystem of the driver assistance system comprising an information fusion module 26, a scene representation module 28 and a knowledge database 58 being supplied with object information of the information fusion module 26 and outputting attributes for the objects to the scene representation module 28.

The scene representation module 28 stores all relevant objects (and their attributes as provided from the knowledge database 58) captured by the external sensing module 22. Every object consists of a description set of its attributes (e.g. physical properties such as soft/rigid) and its relative position with respect to the ego-centred vehicle coordinate-system. In addition, semantic information in terms of object categories like 'car' or 'pedestrian' delivered from the information fusion module 26 as well as more abstract information like the occurrence of a traffic jam in a specific area can be stored in the scene representation module 28.

Figure 2:
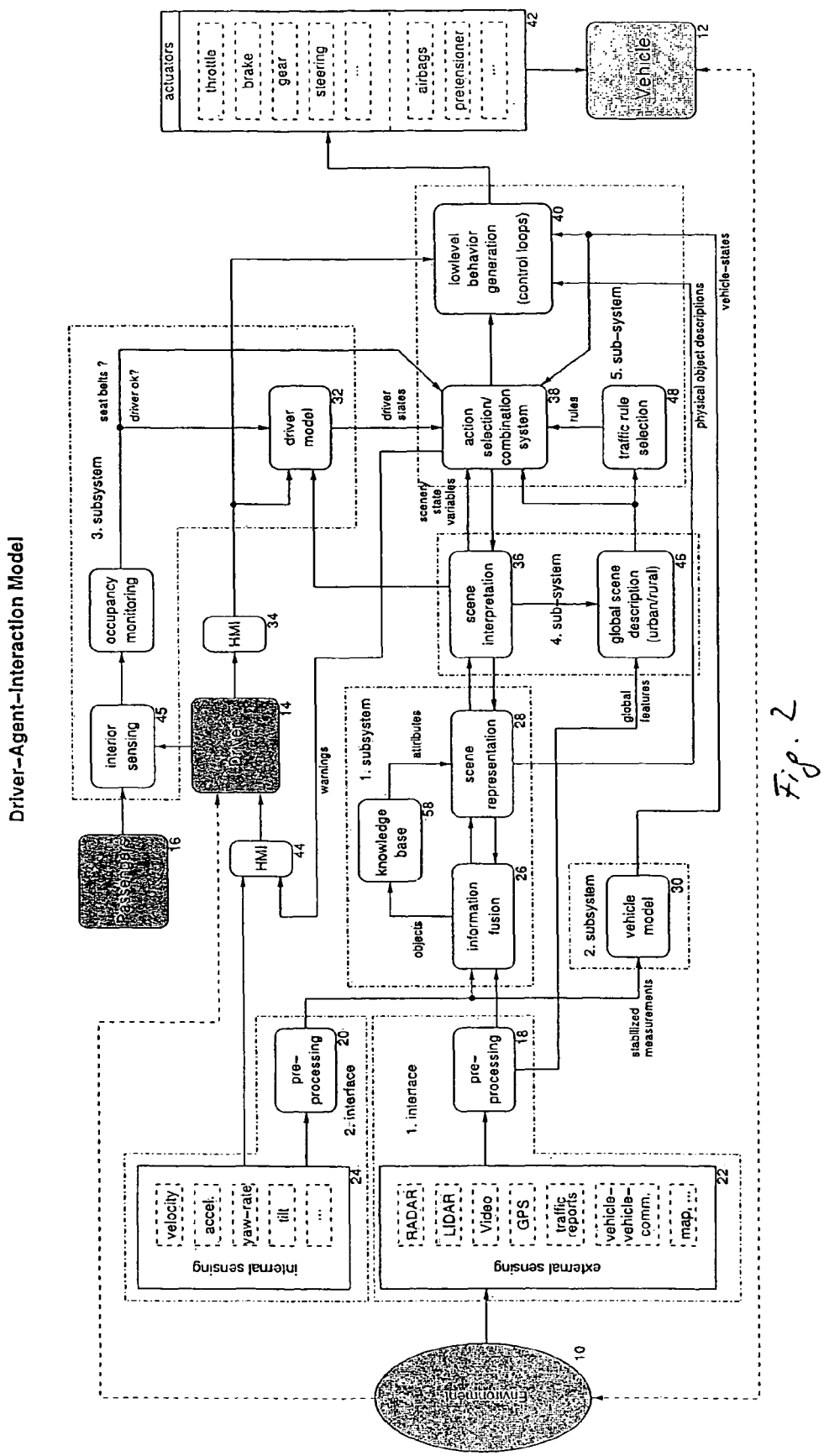

Details are explained in the description of FIG. 2.

The information fusion module 26 combines all the supplied information from the pre-processing units 18 and 20 in order to determine a consistent representation of the environment, which is stored in the scene representation module 28. Robustness of the scene representation is achieved by temporal tracking of the fused information, requiring the current available object descriptions delivered by module 28 as well as the new sensor data provided by the pre-processing modules 18 and 20. Therefore, modules 26 and 28 are highly interconnected. Details are explained in the description of FIG. 2.

The pre-processed internally sensed signals are furthermore supplied to a second subsystem, namely the vehicle model subsystem 30.

The vehicle model subsystem 30 is designed to estimate the internal states of the vehicle based on the internal measurements delivered by module 24. It serves primarily as a state-space observer (e.g. a Kalman-Filter) for producing robust state estimates in cases when some of the internal sensors fail. Secondly, it provides the agent with the knowledge of its own physical dynamics allowing an action selection module 38 to determine if any planned action depending on the physical constraints can be accomplished.

For example, one important estimate is the mass of the vehicle, which might change when carrying many passengers. The vehicle's mass affects the possible acceleration and deceleration and therefore has to be taken into account in a collision avoidance maneuver.

In a third subsystem, a driver model subsystem 32 is connected to a human-machine interface (HMI) 34 manipulated by the driver 14.

The driver-model subsystem 32 serves to determine the intention of the driver by observing the actions of the driver from the human-machine-interface (HMI) 34 and the current scene interpreted by module 36. This intention is important for choosing the optimal action during the action selection process in module 38. E.g. if the turn signal is activated and no obstacle in the corresponding direction is detected by the scene interpretation module, the lateral control for lane-keeping/lane-departure warning has to be deactivated in order to accomplish a lane-change maneuver.

The scene representation module 28 is connected to a scene interpretation module 36, which is in turn connected to an action selection/combination subsystem 38. This subsystem 38 is connected to the output stage of the agent, mainly comprising the (low-level) behavior generation module 40, which is connected to vehicle actuators 42 such as e.g. actuators for the throttle, the brake, the gear-shifting, the steering and safety actuators for the airbags, belt-pretensioners etc.

The scene interpretation module 36 analyses the represented scene of module 28 in respect to the detected objects. E.g. it generates lane information based on detected lane-borders and assigns the traffic signs to the correct lane. Furthermore, relevant objects are determined e.g. the closest vehicle ahead in the lane. The scene interpretation module 36 also guides a relevance filtering process depending on the current task in order to organize perception and support prediction.

The processing of information within the driver assistance system illustrated in FIG. 1 is described next. The sensors 24 for sensing the internal state of the vehicle may comprise sensors for the velocity, acceleration, yaw-rate, tilt and others. Sensor data are also delivered to the driver via an appropriate HMI 44.

The HMI 44 can also notify warnings from the action selection/combination system 38 to the driver 14.

More detailed information may be provided to the assistance system, for example the velocity of each of the wheels of the vehicle. The pre-processing module 20 serves as a temporal stabilization and smoothing unit for the incoming sensory information. Further, it adapts the sensor information for the downstream information fusion process. For example, the information might be adapted to the time step scheme of the processing stage of the agent.

The sensors 22 for sensing the vehicle's environment 10 might deliver for example video, RADAR and LIDAR data. Furthermore, data capture through radio information, vehicle-vehicle-communication or digital maps might be delivered by appropriate devices. The pre-processing unit 18 includes a multitude of different procedures adapted to pre-process the sensor data. Both units 18, 20 forward the pre-processed data to the information fusion module 26, where the external and internal data are fused. For data fusion, a neural network can be used.

Data resulting from the fusion process are delivered to the scene representation module 28, where a scene representing the environment of the vehicle 12 is established. The scene might for example represent the traffic situation. Generally the scene representation contains detected objects, for example cars, motorcycles and/or pedestrians, and a background, for example comprising the street, vegetation and/or sky. A more detailed description of information fusion and scene representation will be given below with regard to FIG. 2.

Data related to the scene representation is also delivered as a feedback to the information fusion module 26, supporting for example the prediction in a subsequent time step.

According to the invention, perception can be organized and supported by prediction. The driver subsystem 32 receives data via HMI 34 from the driver 14. Thus, module 32 can determine and anticipate the intention of the driver, e.g. planned lane-change maneuvers on a multiple lane road (Autobahn, . . . ). Further driver- or passenger-related data is received from interior sensing 45 of vehicle 12. Amongst others, the internal sensory 45 might comprise a camera for observing the driver's eyes. Within the driver model subsystem 32, visual data in combination with further data might lead to a conclusion concerning the driver's state, e.g. estimations of his or her awakeness/drowsiness. The driver model 32 determines and represents driver states for use by the agent, as described below.

Data of the scene representation 28 are further processed within the scene interpretation module 36.

The scene interpretation module 36 outputs signals to the driver model subsystem 32. Suitable data might comprise a representation of statements concerning e.g. distances to other objects (other vehicles) falling below predetermined minimum values or vehicle (relative) velocities above predetermined values.

Further, the scene interpretation module 36 supplies signals to a (global) scene description module 46. Here, a global scenario or scene description is recorded. Most important scenarios relate to 'urban' or extra-urban, resp. "rural" environments. Additionally or alternatively, scenarios like 'Freeway' and 'Highway' might be included. Global features extracted from the pre-processing module 18 are forwarded directly to the scene description module 46.

Data from the scene interpretation module 36 is fed back to the module 28, for example to guide an attention/relevance filtering process in the represented scenario in order to concentrate on the relevant objects in the current situation.

From the scene description module 46, data are handed over to a (traffic) rule-selection module 48. The data might also comprise data forwarded from scene interpretation 36, for example related to a detected traffic sign or a combination of traffic signs. The module 48 comprises a list of traffic signs and other traffic rules as well as representation of global scene descriptions, where each entry in the list points towards one or more traffic rules, for example related to maximum velocity, but also lane changes, parking prohibitions or such like rules. Any kind of assignment of rules to global scenes and/or objects within the scene can be implemented as rule selection module 48.

The subsystem 38 of the agent collects data from several subsystems and modules. The vehicle model 30 delivers data related to the determined state of the vehicle 12. The driver model 32 delivers data related to the state of the driver 14. The scene interpretation 36 hands over data related to state variables of the represented scene. The scene description module 46 delivers data related to the global scenario and weather conditions. The rule selection 48 delivers data related to the traffic rules which are relevant for future actions of the vehicle 12 or the driver 14. The subsystem 38 interprets the data in order to define actions to be taken and possibly to rank required actions according to predetermined criteria related to, e.g., safety. Related data is also fed back to the scene interpretation module 36.

The subsystem 38 can generate warning messages which are directed towards the driver and are outputted via the HMI 44. Suitable interfaces comprise visual or auditory interfaces such as e.g. LEDs, the output of numbers or text onto a display or the front shield or spoken messages.

Data related to the one or more actions to be taken are then handed over to the output stage of the agent, the behavior generation module 40, where the driver-assistance modules like ACC, lane-keeping or collision-avoidance-functions are located. Additional data might be delivered from the scene representation module 28 related to the physical description of objects. Further data related to the driver's intention is inputted from the driver 14 via HMI 34. In module 40, the actions computed by the upstream modules are merged together. For example, there can be implemented a hierarchy of action signals, such that an action signal received from the driver 14 (HMI 34) has highest priority.

The module 40 generates output commands and transmits these to the appropriate actuators 42, for example throttle and brakes, but also steering, gear and further actuators, including actuators related to driver and passengers, for example airbags, pre-tensioners, but possibly also interior lighting, climate control or window regulators.

One embodiment of the invention as described here provides for a variety of interactions between driver and driving assistance agent. The relevant driver's actions are represented by the driver model and further have direct influence on the behavior generation. The agent supports the driver via warnings or more generally by information messages generated by the scene interpretation module and further by controlling the driver-related actuators. Thus, the inventive system is flexible enough to allow for complex interactions and to assist the driver without patronizing him.

FIG. 2 shows in schematic form functional details of the first subsystem for fusing sensed information in order to generate a scene representation and the fourth subsystem for interpreting the current scene in such a way, that some meaningful information about the external scene is available for choosing the optimal action.

The external sensing module 22 comprises, for example, a visual external sensing unit 50 and a extended external sensing unit 52. While the visual external sensing unit 50 captures all sensory information by projective sensor elements like camera, RADAR and LIDAR, the extended external sensing unit 52 receives information from non-projective elements like digital-map data and information that extends the visual range like radio traffic reports or vehicle-vehicle-communication messages.

The visually captured data is forwarded to the feature extraction unit 54, which determines characteristic features of the sensor measurements, e.g. edges in a camera-image and disparity (depth) of a stereo-camera system or distance and velocity data from RADAR/LIDAR-devices. Further, global features are extracted for providing the global scene description unit 46. Suitable global features from camera-images can be determined from frequency-components (Fourier-spectrum, Gabor-wavelets) or the power-density spectrum.

The features delivered by unit 54 are clustered and/or matched against object-models in order to generate object hypothesis from the separate feature modalities by unit 56. Object hypothesis are defined as candidates for real-world objects that have to be further confirmed by additional information integration and consistency validation.

Both, the object hypothesis itself and the corresponding features are transformed (when required) via unit 62 into suitable coordinate systems and are directly fed into the information fusion system 26. The fusion system 26 generates fused object-hypotheses in unit 66 based on a feature binding process in unit 64. The different as well as redundant feature modalities are fused in order to support the corresponding object hypothesis and to discard the inconsistencies in the sensory data. Object-hypothesis fusion and feature binding works hand in hand in this fusion architecture and can be generally performed by statistical fusion methods or neural networks. Algorithms useful for feature binding are known to the skilled person and therefore will not be discussed here. Robustness against measurement noise and uncertain information is achieved by temporal tracking (unit 68) of both, features and object hypothesis.

The fused object hypotheses are further validated by the visual object categorization unit 70 that delivers a semantic descriptions of the objects in terms of the object-type, e.g. 'car', 'pedestrian' or 'traffic sign'.

The physical description (position, velocity, acceleration) of the objects and the corresponding object-type are stored in the scene representation module 28 as a 2½ dimensional sketch in unit 72 that is used for the close-range visual scene exploration. The term "2½ D sketch" represents the fact that it is not possible to fully explore the real 3-D characteristic of a scene by only using 2-D projective sensor-elements.

Object categories delivered by unit 70 are linked to some attributes via the knowledge base 58, e.g. some attributes of detected objects might describe different danger-categories based on the solidity of the objects. Other attributes might be possible motion parameters or motion models for adapting the tracking unit 68. The attributes are also represented in unit 72.

Data from the extended external sensing module 52 are directly fed into the information extraction module 60, which performs map-data analyse and report analyse from the various messages in order to extract relevant information about the traffic situation around the vehicle that cannot be capture by the visual external sensing module 50. The acquired information is mapped into a 2D-space point object representation in unit 74 via the mapping unit 62. The representation in unit 74 is a kind of 'birdview' long-range environment map and is useful for pre-activating specific regions in the 2½ D-sketch representation 72 for guiding attention and supporting prediction in the sensor-fusion module 26.

Examples for data available in unit 74 are map-data information like curves for guiding the lane-detection procedure or rough positions of traffic jams and accidents in order to pre-activate the fusion system for concentrating on stationary targets detection.

Data accumulated in the 2½ D-sketch representation is further evaluated in the scene-interpretation module 36 for giving the agent a kind of 'understanding' what is going on in the current situation based on the acquired object information. Some kind of interpretations in order to 'understand' the scene are the assignment of detected traffic signs to the different lanes or the assignment of detected obstacles to different lanes. Also the interpretation of what is the road or where the vehicle can drive belongs to the task of the scene interpretation module 36.

Module 36 provides the decision/action selection module 38 with some states of the current scene, which comprise discrete, semantic information like the number of lanes, obstacles in that lane as well as continues information like the physical properties of the scene (distances, velocities). Based on that information and the driver's states acquired from occupancy monitoring and delivered by the driver-model the decision system 38 selects the optimal behavior by analysing the state space of the scene.

The scene interpretation module 36 also forwards information to the global scene description unit 46, namely the traffic signs and lane-configuration. The global scene description unit 46 determines global aspects of the scene as already described above using global features delivered by the feature extraction unit 54.

It also tunes the visual object categorization unit 70 according to the different statistics occurring in different global scenes. The global aspects of the scene (urban, extra-urban, highway) are further fed into the knowledge base 48 for determining a proper set of traffic rules valid in the current situation. These rules represent some constraints for the action selection module 38. Further, module 38 guides the attention/relevance filtering module 76 for filtering relevant objects depending on the task or action. The relevance filtering module 76 also receives interpreted information from module 36 that might deliver only those objects, which are in the lane or close to it in respect to the vehicle, for instants.

The action selection information from unit 38 activates or deactivates or combines different driver-assistant modules 40 that might control the vehicle based on physical object information delivered by the scene-representation unit 28. Possible functions are longitudinal control (ACC, ACC stop and go), lateral control (lane-keeping, lane-departure warning), collision avoidance/mitigation, warnings according to traffic rules and so forth.

The internal sensing module 24 is connected to smoothing/stabilization pre-processing unit 20 as already described above. Internal vehicle data might be used in the transformation/mapping unit 62 for correcting the mapping, e.g. using the tilt-angle information for the projective transformation, as well as for the feature binding process and the vehicle model 30, which provides decision/action selection module 38 and the assistance modules 40 with the internal states and the dynamic of the vehicle.

What is claimed is:

1. A driver assistance system comprising:
   a first interface for sensing external signals received from an environment of a vehicle and generating a first interface output signal, the first interface comprising projective sensors and non-projective sensors,
   a second interface for sensing internal signals of the vehicle and generating a second interface output signal,
   a first subsystem comprising
      an information fusion module, a vehicle environment representation module, a vehicle environment interpretation module, and a knowledge base for storing representations of detectable object associated attributes,
      wherein the information fusion module identifies an object based on the first interface output signal and provides the identity of the object to the knowledge base,
      wherein the knowledge base receives said identity of the object and provides attribute signals representing at least one object attribute of the identified object to the vehicle environment representation module, and
      wherein the vehicle environment representation module generates a central model of the vehicle environment comprising at least one representation of an object, wherein each representation of an object comprises the identity of the object and at least one object attribute,
      wherein the vehicle environment interpretation module sends data to the vehicle environment representation module to guide a filtering process that filters identified objects from the central model of the vehicle environment based on relevance,
   a second subsystem for modeling a current internal state of the vehicle based on the second interface output signal,
   a third subsystem for modeling a driver intention,
   a fourth subsystem for analyzing the central model of the vehicle environment represented by the first subsystem in order to distinguish external environmental conditions relevant to the vehicle, and
   a fifth subsystem for ranking a hierarchy of action signals, the action signals generated based on the output signals of the second, the third and the fourth subsystems, wherein the ranking is based on the modeled driver intention, and for generating stimuli for an actuator of the vehicle or the driver based on a highest ranked action signal in the hierarchy.

2. The system according to claim 1,
wherein the fifth subsystem is designed to additionally use additional traffic rules depending on the central model of the vehicle environment.

3. The system according to claim 1,
wherein the fifth subsystem is adapted to feed-back signals to the fourth subsystem representing information related to the generated stimuli and
the fourth subsystem is adapted to analyzes the central model of the vehicle environment in response to the feed-back signal of the fifth subsystem.

4. The system according to claim 1, further comprising
an urban/rural detection subsystem for providing a description of a global scenario, adapted to determine the global scenario by an output signal of the fourth subsystem and to output a signal representing the determined global scenario, wherein the subsystem for generating stimuli for the actuators of the vehicle and/or the driver is adapted to generate these stimuli in response to the output signal of the urban/rural detection subsystem.

5. The system of claim 4, wherein the urban/rural detection subsystem provides an output signal for traffic rule selection.

6. The system according to claim 1, wherein the fourth subsystem is adapted to further generate a stimulus for the third subsystem and the third subsystem is adapted to model the behavior of the driver in response to the input signal of the fourth subsystem and to an input signal from a human machine interface representing an action of the driver.

7. The system according to claim 1, wherein the subsystem for generating stimuli for the actuators and/or the driver is further adapted to generate these stimuli in response to input signals from passenger monitoring.

8. The system according to claim 1, wherein each representation of an object further comprises an object categorization for use in action selection in the fifth subsystem.

9. The system according to claim 1, for use in a vehicle.

10. The system according to claim 1, wherein the central model of the vehicle environment may further comprise weather, road, or traffic information.

11. The system of claim 1, wherein the current task is a lane keeping, and the filtering process further comprises retaining only those identified objects which are in a nearest lane with respect to the vehicle.

12. The system of claim 1, wherein one of the at least one object attributes of the identified object is a rigidity of the object.

13. A driver assistance system, the system comprising:
a first interface for sensing external signals coming from an environment of a vehicle and generating a first interface output signal, the first interface comprising projective sensors and non-projective sensors,
a second interface for sensing internal signals of the vehicle and generating a second interface output signal,
a first subsystem comprising
an information fusion module, a vehicle environment representation module, a vehicle environment interpretation module, and a knowledge base for storing representations of detectable object associated attributes,
wherein the information fusion module identifies an object based on the first interface output signals and provides the identity of the object to the knowledge base,
wherein the knowledge base receives said identity of the object and provides attribute signals representing at least one attribute of the identified object to the vehicle environment representation module, and
wherein the vehicle environment representation module generates a central model of the vehicle environment comprising at least one representation of an object, wherein each representation of an object comprises the identity of the object and at least one object attribute,
wherein the vehicle environment interpretation module sends data to the vehicle environment representation module to guide a filtering process that filters identified objects from the central model of the vehicle environment based on relevance,
a second subsystem for modeling a current internal state of the vehicle based on the second interface output signal,
a third subsystem for modeling a driver intention,
a fourth subsystem for analyzing the central model of the vehicle environment represented by the first subsystem, for ranking a hierarchy of action signals, the action signals generated based on the output signals of the second and the third subsystems, wherein the ranking is based on the modeled driver intention, and for generating stimuli for an actuator of the vehicle or the driver based on a highest ranked action signal in the hierarchy.

14. The system according to claim 13, wherein the fourth subsystem is designed to use additional traffic rules depending on the central model of the vehicle environment.

15. The system according to claim 13, further comprising
an urban/rural detection subsystem for providing a description of a global scenario, adapted to determine the global scenario by an output signal of the fourth subsystem and to output a signal representing the determined global scenario, wherein the subsystem for generating stimuli for the actuators of the vehicle and/or the driver is adapted to generate these stimuli in response to the output signal of the urban/rural detection subsystem.

16. The system of claim 15, wherein the urban/rural detection subsystem provides an output signal for traffic rule selection.

17. The system according to claim 13, wherein the fourth subsystem is adapted to further generate a stimulus for the third subsystem and the third subsystem is adapted to model the behavior of the driver in response to the input signal of the fourth subsystem and to an input signal from a human machine interface representing an action of the driver.

18. The system according to claim 13, wherein the subsystem for generating stimuli is further adapted to generate these stimuli in response to input signals from passenger monitoring.

19. The system according to claim 13, wherein each representation of an object further comprises an object categorization for use in action selection in the fourth subsystem.

20. A system according to claim 13, for use in a vehicle.

21. The system according to claim 13, wherein the central model of the vehicle environment may further comprise weather, road, or traffic information.

22. A method for assisting a driver of a vehicle, comprising the following steps:
sensing external signals of the vehicle using projective sensors and non-projective sensors,
sensing internal signals of the vehicle,
identifying an object based on the external signals of the vehicle and providing the identity of the object to a knowledge base for storing representations of detectable object associated attributes, which in response provides attribute signals representing at least one attribute of the identified object,
generating a central model of the vehicle environment comprising at least one representation of an object, wherein each representation of an object comprises the identity of the object and at least one object attribute, filtering identified objects from the central model of the vehicle environment based relevance, modeling a driver intention, analyzing the central model of the vehicle environment in order to distinguish external environmental conditions relevant to the vehicle, and combining the analyzed central model of the vehicle environment and the behavior of the driver in order to generate rank a hierarchy of action signals, the action signals based on the relevant identified objects, wherein the ranking is based on the modeled driver intention, and in order to output a stimulus for an actuator of the vehicle or the driver based on a highest ranked action signal in the hierarchy.

23. A computer software program product embodied on a computer readable medium which when executed by a computer performs the method steps of:

sensing external signals of a vehicle using projective sensors and non-projective sensors, sensing internal signals of the vehicle, identifying an object based on the external signals of the vehicle and providing the identity of the object to a knowledge base for storing representations of detectable object associated attributes, which in response provides attribute signals representing at least one attribute of the identified object, generating a central model of the vehicle environment comprising at least one representation of an object, wherein each representation of an object comprises the identity of the object and at least one object attribute, filtering identified objects from the central model of the vehicle environment based on relevance, modeling a driver intention, analyzing the central model of the vehicle environment in order to distinguish external environmental conditions relevant to the vehicle, and combining the analyzed central model of the vehicle environment and the behavior of the driver in order to generate rank a hierarchy of action signals, the action signals based on the relevant identified objects, wherein the ranking is based on the modeled driver intention, and in order to output a stimulus for an actuator of the vehicle or the driver based on a highest ranked action signal in the hierarchy.

24. The computer program product according to claim 23 comprising firmware, adapted for flashing the firmware into a programmable device of a vehicle.

25. A data storage device onto which the computer software program product of claim 23 is stored.

26. A method for assisting a driver of a vehicle, comprising the following steps:

sensing external signals of the vehicle using projective sensors and non-projective sensors, sensing internal signals of the vehicle, identifying an object based on the external signals of the vehicle and providing the identity of the object to a knowledge base for storing representations of detectable object associated attributes, which in response provides attribute signals representing at least one attribute of the identified object, generating a central model of the vehicle environment comprising at least one representation of an object, wherein each representation of an object comprises the identity of the object and at least one object attribute, filtering identified objects from the central model of the vehicle environment based on relevance, modeling a driver intention, and analyzing the central model of the vehicle environment, ranking a hierarchy of action signals, the action signals based on the relevant identified objects, wherein the ranking is based on the modeled driver intention, and generating a stimulus for at least one of an actuator of the vehicle or the driver based on a highest ranked action signal in the hierarchy.

27. The method of claim 26 analyzing the central model of the vehicle environment in order to distinguish external environmental conditions relevant to the vehicle.

28. A computer software program product embodied on a computer readable medium which when executed by a computer performs the method steps of:

sensing external signals of the vehicle using projective sensors and non-projective sensors, sensing internal signals of the vehicle, identifying an object based on the external signals of the vehicle and providing the identity of the object to a knowledge base for storing representations of detectable object associated attributes, which in response provides attribute signals representing at least one attribute of the identified object, generating a central model of the vehicle environment comprising at least one representation of an object, wherein each representation of an object comprises the identity of the object and at least one object attribute, filtering identified objects from the central model of the vehicle environment based on relevance, modeling a driver intention, and analyzing the central model of the vehicle environment, ranking a hierarchy of action signals, the action signals based on the relevant identified objects, wherein the ranking is based on the modeled driver intention, and generating a stimulus for at least one of an actuator of the vehicle or the driver based on a highest ranked action signal in the hierarchy.

29. The computer program product according to claim 28 comprising firmware, adapted for flashing the firmware into a programmable device of a vehicle.

30. A data storage device onto which the computer software program product of claim 28 is stored.

31. A driver assistance system comprising:

a first interface for sensing external signals received from an environment of a vehicle and generating a first interface output signal, a second interface for sensing internal signals of the vehicle and generating a second interface output signal, a first subsystem comprising an information fusion module, a vehicle environment representation module, and a knowledge base for storing representations of detectable object associated attributes, wherein the information fusion module identifies an object based on the first interface output signal and provides the identity of the object to the knowledge base, wherein the knowledge base receives said identity of the object and provides attribute signals representing at least one object attribute of the identified object to the vehicle environment representation module, and wherein the vehicle environment representation module generates a central model of the vehicle environment comprising at least one representation of an object, wherein each representation of an object comprises the identity of the object and at least one object attribute, and a second subsystem for modeling a current internal state of the vehicle based on the second interface output signal, a third subsystem for modeling a driver intention, a fourth subsystem for analyzing the central model of the vehicle environment represented by the first subsystem in order to distinguish external environmental conditions relevant to the vehicle, and a fifth subsystem for ranking a hierarchy of action signals, the action signals generated based on the output signals of the second, the third and the fourth subsystems, wherein the ranking is based on the modeled driver intention, and for generating stimuli for an actuator of the vehicle or the driver based on a highest ranked action signal in the hierarchy.

32. The system of claim 31, wherein one of the at least one object attributes of the identified object is a rigidity of the object.

* * * * *